Patented Sept. 29, 1936

2,055,810

UNITED STATES PATENT OFFICE 2,055,810

MOTOR FUEL COMPOSITION

Thomas W. Bartram, Nitro, W. Va., assignor, by mesne assignments, to Monsanto Chemical Company, Wilmington, Del., a corporation of Delaware No Drawing. Application April 4, 1932, Serial No. 603,232

10 Claims. (Cl. 44—9)

The present invention relates to a composition of matter comprising oil products for use as liquid fuels in internal combustion engines, as lubricating oils, as transformer oils, as a circulating medium in oil heating systems, and the like.

One object of the present invention is to provide a new treated oil composition possessing desirable stabilizing properties.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactorily stable mineral oil product be employed.

It is well known that combustible liquids derived from mineral oils before the usual refining processes, frequently and in some cases invariably, contain a proportion of ingredients which give rise to resin formation. This is particularly the case with various fractions of oils produced by different refining and treating means from various crude oils. Immediately and for a short time after distillation, such unrefined motor fuel, for example cracked gasoline, may be comparatively free from non-volatile resinous matter, but on storage or when used in internal combustion engines give rise to resinous material. The resinous material on storage may either remain dissolved in the liquid, or in certain cases be partially separated.

A further object of the present invention is to substantially prevent or greatly reduce the resin formation in such liquids, thus rendering it possible to store them for substantially long periods of time without deterioration and to use them satisfactorily as fuels in internal combustion engines, thus avoiding or considerably reducing refining losses.

It has been recognized that if the above mentioned fuels could be treated in some manner which would prevent resin formation, there would be a great advantage in using such fuel which has been refined as little as possible in view of the economy of utilizing the whole of the unsaturated constituents and also because these constituents possess valuable anti-knock properties.

According to the present invention, a new oil composition has been obtained which has particularly desirable characteristics and which is resistant to the formation of gummy and resinous deposits. More particularly, the present invention relates to the incorporation in a mineral oil or material derived therefrom, of a suitable material which greatly inhibits the formation of resin, gum and like deposits.

The class of materials which have been found to possess the desirable qualities set forth in that small proportion thereof when incorporated in a relatively unstable oil product, for example, gasoline, materially increases the stability thereof, comprises ketone-primary amine reaction products. More particularly the present invention relates to the use of reaction products of a ketone with an aromatic primary amine as a stabilizer for oil products such as, for example, gasoline.

In order to test the gum inhibiting properties of the preferred class of materials the following procedure, which is essentially that described by E. B. Hunn, H. G. M. Fischer and A. J. Blackwood in the Society of Automotive Engineers Journal, vol. 26, #1 (1930), pages 32 and 33, was employed.

Into an Emerson coal calorimeter bomb having a capacity of 500 cc., a small glass open vessel having a capacity of substantially 150 cc., was placed, which contained 100 cc. of an untreated unstable gasoline, such as, for example, a gasoline known as "cracking coil distillate", to which had been added a small proportion of one of the preferred class of materials which may be called "gum inhibitors". The lid was then placed tightly on the bomb. Substantially one hundred pounds pressure of oxygen was then introduced by means of a delivery tube, after which said delivery tube was closed by means of a suitable valve. The bomb was then connected by means of a delivery tube with a pressure gauge having a range between 0 to 200# and having an accurate scale from 100–150#, after which it was heated preferably by immersing it in a hot water bath maintained at 95 to 98 deg. C. and maintained at said temperature so long as there was no appreciable drop in pressure as indicated by the pressure gauge. A drop in pressure indicates a reaction between the oxygen and the unstable portion of the gasoline. The period of time elapsing before this reaction takes place is indicative of the stability of the gasoline. For the special type of gasoline mentioned, that is the gasoline known as "cracking coil distillate", the period of stability as hereinafter employed is the time in minutes from the time of the immersion of the bomb in the bath maintained at a temperature of 97–98 deg. C. until there is a drop in pressure on the pressure gauge of 15 pounds per square inch.

As one method of operating the present invention, one of the preferred materials, for example 30 m. g. of a reaction product of acetone and aniline comprising acetone anil of the probable formula

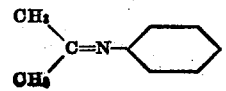

was dissolved in 100 c. c. of unstable gasoline, known as "cracking coil distillate" and a test carried out in the Emerson bomb in the manner described. The period of stability, or in other words the period of time from the immersion of the bomb in the liquid maintained at 97–98 deg. C. until a decrease of 15 pounds per square inch was indicated on the pressure gauge was 225 minutes.

A test carried out in a manner identical with that given above, with the exception that no "gum inhibitor" was added had a period of stability of 95 minutes.

If convenient or desirable, if the inhibitor to be added to the unstable oil product, for example gasoline is not readily soluble therein, it may be dissolved in a solvent, for example isopropyl alcohol, benzol and other like solvents, fully miscible with said unstable oil product, and the solution of the inhibitor thus prepared added thereto.

Further examples of the preferred class of "gum inhibitors" are given in Table I.

Table I

| Gum inhibitor | Wt. of gum inhibitor added— m. g. | c. c. "cracking coil distillate" | Period of stability before pressure in the bomb dropped 15 pounds per sq. in. |
|---|---|---|---|
| Reaction product of diacetone alcohol and aniline | 50 | 100 | 306 |
| Methyl ethyl ketone-anil | 50 | 100 | 160 |
| Acetone alpha naphthile | 50 | 100 | 250 |
| Mesityl oxide anil | 50 | 100 | 150 |
| Acetone semicarbazone | 50 | 100 | 116 |
| P-ethoxy acetone anil | 50 | 100 | 1224 |
| None | | 100 | 95 |

The following are probable formulae ascribed to the materials given in Table I. Reaction product of diacetone alcohol and aniline, Methyl ethyl ketone-anil, Acetone alpha naphthile, Mesityl oxide anil, Acetone semicarbazone, P-ethoxy acetone anil, Other ketone-primary amine products that have been incorporated in an unstable gasoline, as for example "cracking coil distillate" and found to possess anti-gum forming properties comprise the following: diacetone amine of the probable formula acetophenone anil of the probable formula, the oxalic acid salt of the reaction product of acetone and aniline of the probable formula, the reaction product of benzyl amine and acetone of the probable formula, the reaction product of anthraquinone and aniline of the probable formula, reaction product of benzoin and alpha naphthyl amine which may have the following structural formula dibenzyl amine ethylidene acetone which may have the probable formula As seen from the above data the preferred class of materials comprise an important class of stabilizers for oil products, such as for example gasoline. Other similar oil compositions designed for particular uses may be prepared in the manner described by merely substituting the desired oil fraction or cut and adding the necessary quantity of gum inhibitor thereto. To produce the effect desired, a quantity of inhibitor equal to from approximately 0.001 to 0.05% of the weight of the oil is employed.

Other ratios of the preferred class of materials than those hereinbefore set forth have been incorporated in an unstable oil product, for example gasoline. Further, other methods of testing the preferred class of materials than those hereinbefore set forth may be employed. The present invention is limited solely by the claims attached hereto as part of the present specification.

What is claimed is:

1. A cracked hydrocarbon motor fuel of the type which tends to deteriorate on storage as evidenced by color and gum formation containing as a stabilizer thereof a small quantity of a condensation product of a ketone with a primary aromatic amine possessing the structural formula of

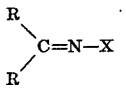

where R is an aliphatic or aromatic hydrocarbon radical and X is an aromatic hydrocarbon radical.

2. A cracked hydrocarbon motor fuel of the type which tends to deteriorate on storage as evidenced by color and gum formation containing as a stabilizer thereof a small quantity of a ketone anil possessing the structural formula of

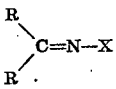

where R is an aliphatic radical and X is an aromatic radical.

3. A cracked hydrocarbon motor fuel of the type which tends to deteriorate on storage as evidenced by color and gum formation containing as a stabilizer thereof a small quantity of acetone-anil.

4. A cracked hydrocarbon motor fuel of the type which tends to deteriorate on storage as evidenced by color and gum formation containing as a stabilizer thereof a small quantity of p-ethoxy acetone-anil.

5. Gasoline produced by the cracking of petroleum oils containing as a gum inhibitor a small quantity of a condensation product of a ketone with a primary aromatic amine possessing the structural formula of

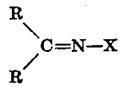

where R is an aliphatic or aromatic hydrocarbon radical and X is an aromatic hydrocarbon radical.

6. Gasoline produced by the cracking of petroleum oils containing as a gum inhibitor a small quantity of a ketone anil possessing the structural formula of

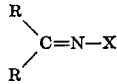

where R is an aliphatic radical and X is an aromatic radical.

7. A cracked hydrocarbon motor fuel of the type which tends to deteriorate on storage as evidenced by color and gum formation containing as a stabilizer thereof a small quantity of a ketone-amine condensation product possessing the structural formula of

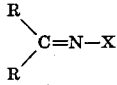

where R is an aliphatic or aromatic hydrocarbon radical and X is an aromatic radical.

8. Gasoline produced by the cracking of petroleum oils containing as a gum inhibitor a small quantity of a ketone-amine condensation product possessing the structural formula of

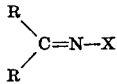

where R is an aliphatic or aromatic hydrocarbon radical and X is an aromatic radical.

9. Gasoline produced by the cracking of petroleum oils containing as a gum inhibitor a small amount of acetone anil.

10. Gasoline produced by the cracking of petroleum oils containing as a gum inhibitor a small amount of p-ethoxy acetone-anil.

THOMAS W. BARTRAM.